(12) United States Patent
Hennig et al.

(10) Patent No.: US 6,364,002 B1
(45) Date of Patent: Apr. 2, 2002

(54) HEAT STORAGE APPARATUS

(75) Inventors: Christoph Hennig, Schwabach; Jochen Scharrer, Neumarkt; Bernd Schulz, Ilsfeld, all of (DE)

(73) Assignee: IVT Installations und Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 09/622,934

(22) PCT Filed: Feb. 13, 1999

(86) PCT No.: PCT/EP99/00955

§ 371 Date: Aug. 24, 2000

§ 102(e) Date: Aug. 24, 2000

(87) PCT Pub. No.: WO99/43988

PCT Pub. Date: Sep. 2, 1999

(30) Foreign Application Priority Data

Feb. 24, 1998 (DE) .......................................... 198 07 657

(51) Int. Cl.[7] .............................................. F28D 17/00
(52) U.S. Cl. ............................... 165/10; 165/DIG. 902; 126/641; 126/643
(58) Field of Search ..................... 165/10, 48.1, 236, 165/DIG. 902, 641–643; 126/400, 569; 62/434, 59

(56) References Cited

U.S. PATENT DOCUMENTS

| | | | | |
|---|---|---|---|---|
| 2,396,338 A | * | 3/1946 | Newton | 165/10 |
| 3,412,728 A | * | 11/1968 | Thomason | 165/10 |
| 4,091,622 A | * | 5/1978 | Marchesi | 165/9.1 |
| 4,139,055 A | | 2/1979 | Thomason et al. | |
| 4,187,831 A | * | 2/1980 | Eubank | 165/164 |
| 4,237,963 A | * | 12/1980 | Girard | 165/45 |
| 4,265,224 A | * | 5/1981 | Meyer | 126/436 |
| 4,479,487 A | | 10/1984 | Migdal | |
| 6,158,499 A | * | 12/2000 | Rhodes et al. | 165/10 |

FOREIGN PATENT DOCUMENTS

| | | |
|---|---|---|
| DE | 93 15 785.1 | 2/1994 |
| DE | 94 18 656.1 | 5/1995 |
| DE | 296 01 783.3 | 7/1996 |
| WO | WO97/41395 | 11/1997 |

* cited by examiner

*Primary Examiner*—Henry Bennett
*Assistant Examiner*—Terrell McKinnon
(74) *Attorney, Agent, or Firm*—Sughrue Mion, PLLC

(57) ABSTRACT

A heat storage apparatus for a temperature range of about 10 to 95 degrees Celsius, especially for solar installations, heat pumps, boilers or the like and for extraction of heat for the operation of a room heating installation and/or an installation for water for use, consists of a low-temperature latent heat storage device and a downstream water reservoir. In that case, the fresh water feed for the installation for water for use runs, for preheating, through the low-temperature latent heat storage device before entry into the water reservoir and the return of the heat exchanger runs, for further cooling down of the return flow to the lowest possible temperature level, through the low-temperature latent heat storage device after exit from the water reservoir.

9 Claims, 2 Drawing Sheets

HEAT STORAGE APPARATUS

BACKGROUND OF THE INVENTION

The present invention relates to a heat storage apparatus for a temperature range of 10 to 95 degrees Celsius.

The heat storage apparatus of the kind with a water reservoir and at least one heat exchanger serve preferably for the storage of the heat of solar installations and heat pumps and for the extraction of heat for operation of a room heating installation and/or an installation for water for use. These heat storage apparatus are, however, subject to the disadvantage that the return flow temperature is too high for, in particular, a solar installation and the collector field thereby has to operate with poor efficiency.

SUMMARY OF THE INVENTION

The invention therefore has the object of further developing a heat storage apparatus so that the return flow to the solar installation is reduced in its temperature as far as possible.

BRIEF DESCRIPTION OF THE DRAWINGS

Embodiments of the invention are reproduced in the drawings, in which.

DETAILED DESCRIPTION OF THE INVENTION

Figure 1:
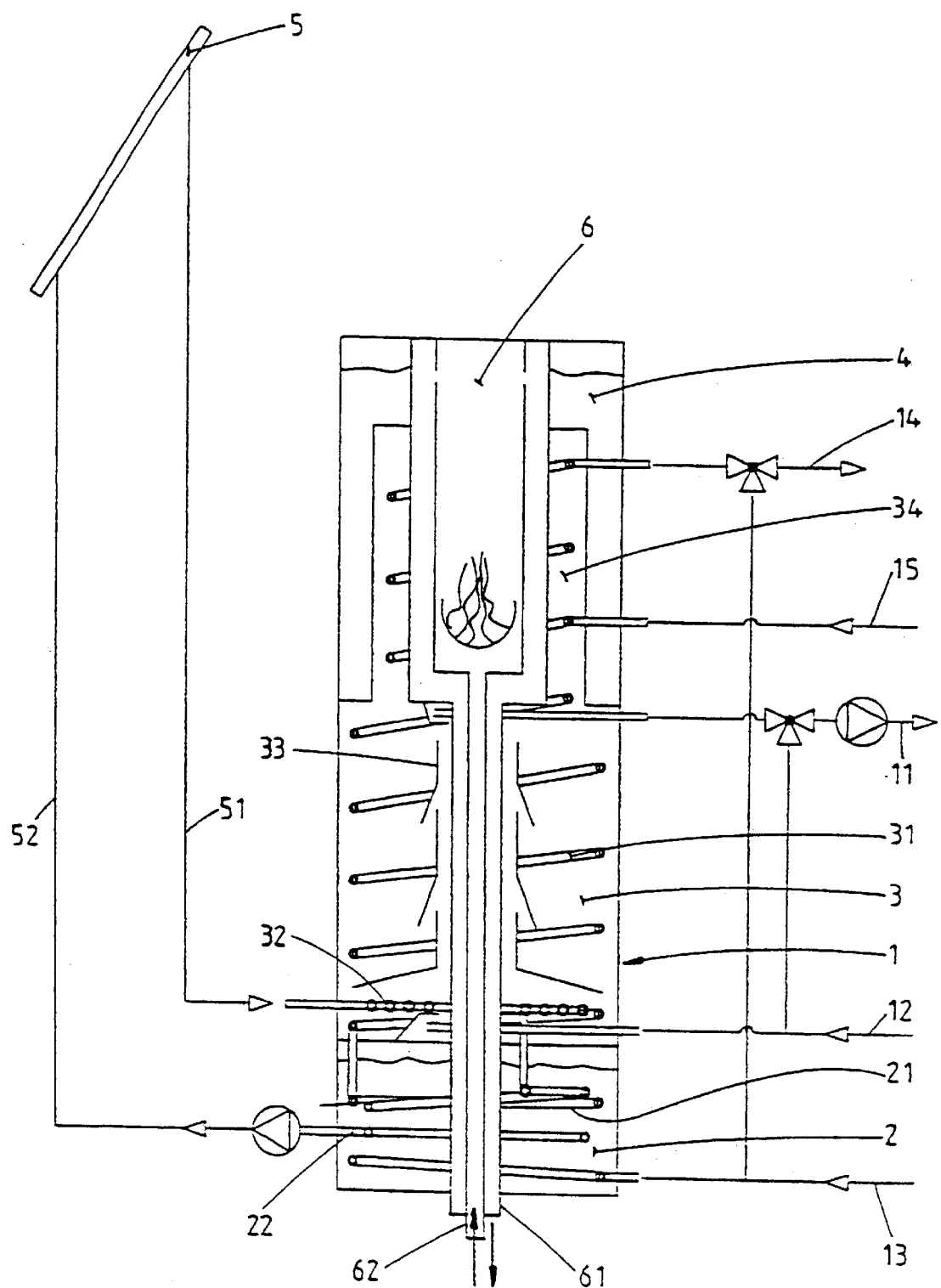
FIG. 1 shows a vertical section through the heat storage apparatus with integrated boiler and FIG. 2 shows a vertical section through a heat storage apparatus with separate boiler.

A heat storage apparatus 1 can store heat in a temperature range of 10 to 95 degrees Celsius. The heat can be made available by a solar installation 5, a heat pump or a boiler 6. It can then be extracted again at the heat storage apparatus 1 for operation of a room heating installation 11, 12 and/or a water-using installation 13, 14. The room heating installation has, in known manner, a feed 11 and a return 12 and the installation for water for use has a fresh water duct 13, a duct 14 for water for use to tapping points and a circulation duct 15. The water temperature is regulated by a three-way cock not only in the feed 11 of the room heating installation, but also in the duct 14 for water for use.

The heat storage apparatus 1 consists of a low-temperature (LT) latent heat storage means 2, a downstream water reservoir 3 and possibly also a further downstream high-temperature (HT) latent heat storage means 4, which can also consist, in modular mode of construction, of individual separable units. A heat exchanger 21 is disposed in the LT latent heat storage means 2 and a heat exchanger 31 in the water reservoir 3. The two heat exchangers 21, 31 are hydraulically connected in series and form a unit. The same applies in each case to a second heat exchanger 22 in the LT latent heat storage means 2 and a heat exchanger 32 in the water reservoir 3. These two heat exchangers 22, 32 are also connected in series and hydraulically form a unit. The water reservoir 3 is formed as a layer store with guide plates 33, wherein the guide plates 33 assist temperature stratification in the reservoir 3.

The fresh water duct 13 is connected with the first heat exchanger 21. The cold freshwater therefore runs through the LT latent heat storage means 2 and this would, if no feed of heat were to take place, be cooled down to the low temperature level of the fresh water of about 15 degrees Celsius.

However, heat is fed to the heat storage apparatus 1 from a heat source, for example a solar collector installation 5. The collector feed 51 is connected with the inlet of the second heal exchanger 32 of the water reservoir 3 and the collector return 52 is connected with the outlet of the second heat exchanger 22 in the LT latent heat storage means 2. This means that the solar-heated heat carrier liquid of the collector circuit initially delivers its heat in the water reservoir 3 in a medium temperature range of 20 to 60 degrees Celsius and then still flows through the LT latent heat storage means 2, where it delivers its residual heat at a low temperature level of about 15 to 25 degrees Celsius. The LT latent heat storage means 2 and thus the fresh water flowing through the first heat exchanger 21 are thereby now heated up. A latent heat storage means 2 with a high storage capacity is accordingly necessary at this place, because the residual heat during the day arises only in a limited time span, whereas the time span in which fresh water must be preheated is very much greater. Due to the LT latent heal storage means 2 it is ensured that the solar return flow is similarly disposed at a very low temperature level, whereby the efficiency of the solar installation 5 is substantially increased.

The HT latent heat storage means 4 serves for possibly necessary reheating of the heat storage apparatus 1 by an integrated boiler 6. In order to guarantee an energy-saving operation of the burner, this should have the smallest possible ignition phases (low "cycling") with longest possible burner running times in order to achieve good efficiency and low noxious substance emission. The HT latent heat storage means 4 with a large heat capacity is particularly suitable for that purpose. The heat can be stored therein in a temperature range of 50 to 95 degrees Celsius.

In FIG. 1 there is illustrated a heat storage apparatus 1 with a boiler 6 in plunger mode of construction, which is integrated into the HT latent heat storage means 4. Fresh air is conducted to and exhaust gas conducted from the boiler 6 by a double tube 61, 62. The double tube 61, 62 runs from the boiler 6 into the HT latent heat storage means 4 through the water reservoir 3 and the LT latent heat storage means 2 into the free atmosphere. In that case the exhaust gas flows through the space, which is annular in cross-section, between the two tubes 61, 62, whereas the fresh air flows in the inner tube 62 to the boiler 6. The cold fresh air in the tube 62 is therefore preheated by the hot exhaust gas. Moreover, the exhaust gas delivers its heat in succession firstly to the HT latent heat storage means 4, then to the water reservoir 3 and finally to the LT latent heat storage means 2, wherein if the temperature of 100 degrees Celsius is fallen below the steam condenses and condensation heat is delivered ("calorific value technology").

Figure 2:
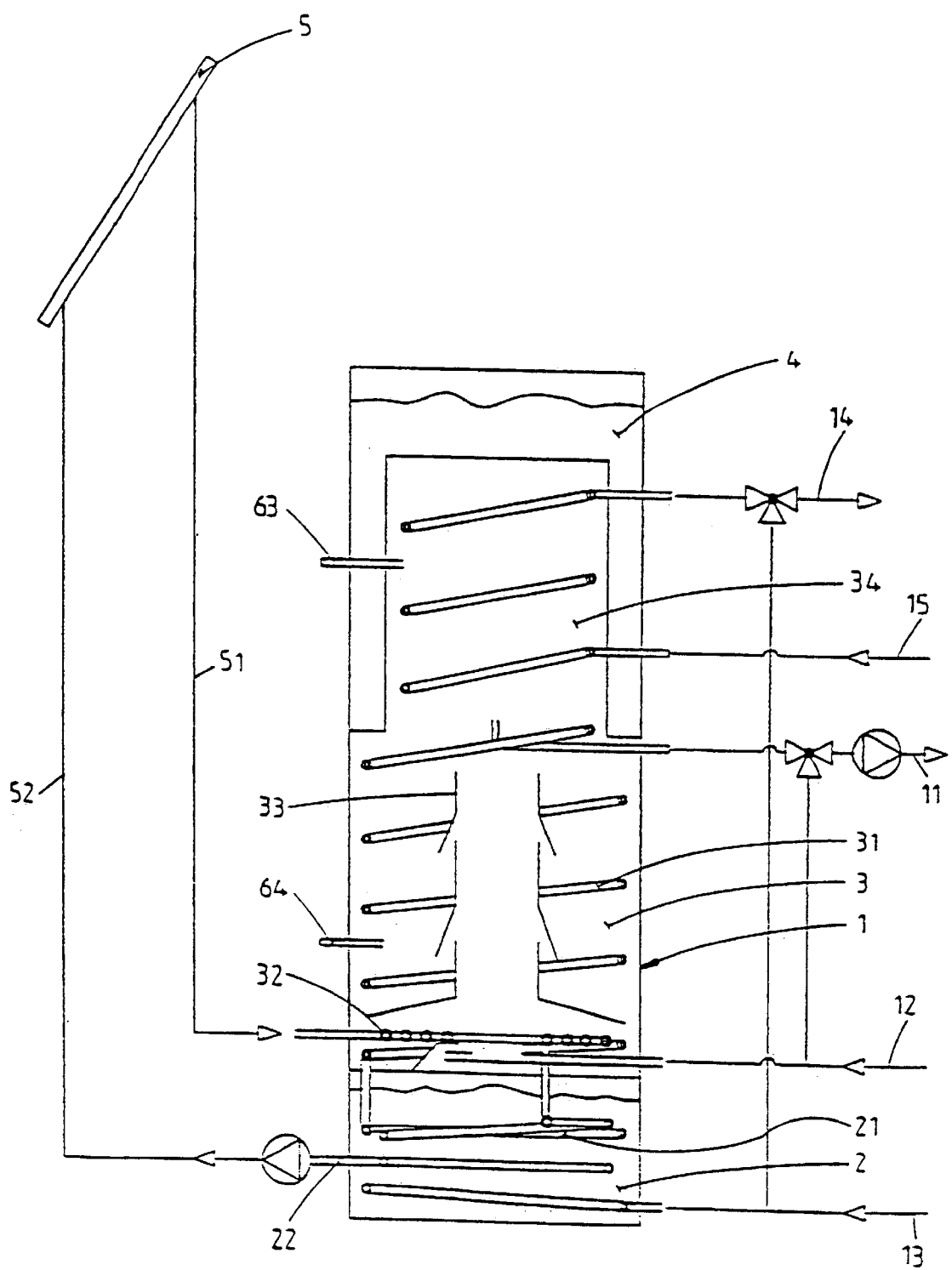

The heat storage apparatus 1 illustrated in FIG. 1 with integrated boiler 6 in plunger mode of construction represents only one preferred form of embodiment. However, it is also possible, without further measures, to operate the heat storage apparatus 1 with an adjacently disposed boiler, as is illustrated in FIG. 2. This has, however, the disadvantage that the calorific value method cannot be realized with an adjacently disposed boiler or can be realized only with considerable technical outlay. The boiler is connected to the boiler feed connection 63 and to the boiler return connection 64.

The construction, which is reproduced in figs. 1 and 2, of the HT latent heat storage means 4, which surrounds the upper part 34 of the water reservoir 3 in the manner of a jacket, has the advantage that a constructive water-for-use priority circuit is given, as the upper water reservoir part 34 is automatically heated by the boiler first of all and the heating feed 11 lies below in the relatively colder temperature range.

A further advantage of this construction consists in that for the heat transfer from the upper water reservoir part 34 to the HT latent heat storage means 4 a greater heat exchange area is available than would be the case, for example, in the case of a heating coil.

| Reference Numeral List | |
|---|---|
| 1 | heat storage apparatus |
| 11 | heating feed |
| 12 | heating return |
| 13 | fresh water duct |
| 14 | water-for-use duct |
| 15 | circulation duct |
| 2 | low-temperature (LT) latent heat storage means |
| 21 | heat exchanger |
| 22 | heat exchanger |
| 3 | water reservoir |
| 31 | heat exchanger |
| 32 | heat exchanger |
| 33 | guide plate |
| 34 | upper water reservoir part |
| 4 | high-temperature (HT) latent heat storage means |
| 5 | solar collector installation |
| 51 | collector feed |
| 52 | collector return |
| 6 | boiler |
| 61 | exhaust gas flue |
| 62 | fresh water tube |
| 63 | boiler feed |
| 64 | boiler return |

What is claimed is:

1. A heat storage apparatus for a heat temperature range of substantially 10 to 90° C., comprising a low-temperature latent heat storage means, a water reservoir downstream of the low-temperature latent heat storage means, a first heat exchanger arranged in the low-temperature latent heat storage means and having inlet means for connection with a water feed duct so that water supplied by the feed duct can be preheated in the low-temperature latent heat storage means, a second heat exchanger arranged to extend through the water reservoir and to be in series connection with the first heat exchanger and having outlet means for connection with a water outlet duct, a solar heat collector for heating a heat carrier liquid by solar heating, a third heat exchanger arranged in a lower part of the water reservoir and having inlet means connected with a liquid feed from the collector, and a fourth heat exchanger arranged in the low-temperature latent heat storage means to be in series connection with the third heat exchanger and having outlet means connected with a liquid return for the collector so that the carrier liquid can be cooled down in the low-temperature latent heat storage means before return to the collector.

2. The apparatus according to claim 1 wherein the water reservoir is constructed as a layer reservoir.

3. The apparatus according to claim 2 comprising guide plates arranged in the reservoir to assist layering of water flows into and out of the reservoir.

4. The apparatus according to claim 1 comprising a boiler with an exhaust gas heat exchanger connected with the low-temperature latent heat storage means.

5. The apparatus according to claim 1 comprising a boiler with an exhaust gas heat exchanger connected with the water reservoir.

6. The apparatus according to claim 1 comprising a high-temperature latent heat storage means downstream of the water reservoir.

7. The apparatus according to claim 6 comprising a boiler with an exhaust gas heat exchanger integrated into the high-temperature latent heat storage means.

8. The apparatus according to claim 7 comprising a first tube arranged to conduct air to the boiler and a second tube surrounding the first tube and arranged to conduct exhaust gas away from the boiler in a flow direction opposite to that of the air, the first and second tubes extending through the water reservoir and the low-temperature latent heat storage means.

9. The apparatus according to claim 6, wherein the high-temperature latent heat storage means surrounds an upper part of the water reservoir.

\* \* \* \* \*